United States Patent [19]

Dunnion

[11] Patent Number: 4,943,942
[45] Date of Patent: Jul. 24, 1990

[54] FULL-DUPLEX MODEM USING A SINGLE PROCESSOR

[75] Inventor: Dermot Dunnion, Santa Clara, Calif.

[73] Assignee: Advanced Micro Devices, Sunnyvale, Calif.

[21] Appl. No.: 910,111

[22] Filed: Sep. 19, 1986

[51] Int. Cl.$^5$ .............................................. H04J 3/12
[52] U.S. Cl. ........................................ 364/900; 375/8; 364/929; 364/932.8
[58] Field of Search ... 364/200 MS File, 900 MS File, 364/200, 900; 375/8, 7, 9; 370/29, 32

[56] References Cited

U.S. PATENT DOCUMENTS

| | | | |
|---|---|---|---|
| 4,085,449 | 4/1978 | Walsh et al. | 364/900 |
| 4,156,796 | 5/1979 | O'Neal et al. | 364/900 |
| 4,263,670 | 4/1981 | Sherman | 364/900 X |

Primary Examiner—Eddie P. Chan
Assistant Examiner—Paul V. Kulik
Attorney, Agent, or Firm—Kenneth B. Salomon; Richard E. Cummins

[57] ABSTRACT

Method of scheduling execution of transmit-side and receive-side procedures by a single processor in a full-duplex modem. Buffers of minimal size are employed in conjunction with the processor to guarantee no errors in the signal processing procedures. In one embodiment, transmit-side procedures are given priority so that if a transmit-enable signal is received, a receive-side procedure being executed by the processor is interrupted to allow execution of the transmit-side procedure. This priority is most useful because transmit-side procedures execute more rapidly than do receive-side procedures.

1 Claim, 4 Drawing Sheets

FULL-DUPLEX MODEM USING A SINGLE PROCESSOR

The present invention relates generally to signal processors in data transmission and receiving systems, such as a modulator-demodulator (modem), and more specifically, to the time-shared use of a single processor performing transmit-side and receive-side procedures in a full-duplex modem.

BACKGROUND OF THE INVENTION

Transmission of digital data over analog signal lines, such as telephone lines, involves a number of signal-processing procedures; such as digital-to-analog conversion (DAC), analog-to-digital conversion (ADC), digital and analog filtering, noise suppression, and the like. Typically, separate control of the transmitter-side and the receiver-side are employed to execute these procedures. Particularly, full-duplex operation of a modulator-demodulator (modem) in which simultaneous bidirectional data transmission; i.e., transmission and reception of data signals at the same time.

Although the receive-side and transmit-side procedures are similar in nature, and could be performed by the same micro-processor, in full-duplex operation, the transmitter and receiver of a modem operate at similar, but not identical, speeds. Hence, the processing procedures for the transmitted data and the received data are required to be run at the same time, on occasion. Accordingly, modems employ separate microprocessors, one for the transmit-side and one for the receive-side.

Provision of two separate microprocessors which duplicate each other's capability is a wasteful, expensive and ill-advised from a reliability standpoint. Exacerbating this situation, is the case of a single integrated circuit which is to house all elements of a modem, i.e., a single-chip modem. In this case valuable die space is wasted by the use of two processors.

SUMMARY OF THE INVENTION

Use of a single processor in a full-duplex modem is supported by two very small buffers of minimal size while eliminating signal-processing errors. The single processor is time-shared between the transmitter and receiver and the buffers are used in conjunction with the single processor guaranteeing no errors.

Timing of the transmit- and receive-side signal processing procedures by the single processor is controlled by reception of transmit-enable and receive-enable signals, respectively. However, actual execution of the transmit- and receive-side procedures varies according to the time-sharing procedure employed by the processor. In one embodiment of the invention, transmission takes precedence over reception of data and reception of a transmit-enable signal interrupts an on-going reception of data and the latter continues only over transmission is completed. However, reception of a receive-enable signal during transmission does not interrupt the on-going transmission of data and reception begins only after transmission is completed. In an illustrative embodiment, a single-chip modem employs a single processor of the present invention.

DETAILED DESCRIPTION OF PREFERRED EMBODIMENT

Figure 1:
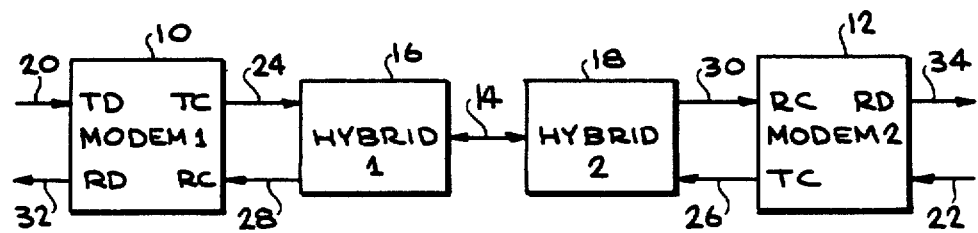
FIG. 1 illustrates two modulator/demodulators (modems) connected to a telephone line.

Shown in FIG. 1 is a typical utilization of two modulator-demodulators (modems) 10 and 12 on a telephone line 14. Hybrid circuits 16 and 18 include inductor coils and balancing network, as is known to those skilled in the art, and modems 10 and 12 connect to telephone line 14 via hybrid circuit 16 and 18, respectively.

Each modem shown in FIG. 1 converts digital data signals (TD) applied to a signal line 20 or 22 into analog signals (TC) generated on a signal line 24 or 26 to be transmitted on telephone line 14. Each modem also converts analog data signals (RC) applied to a signal line 28 or 30 into digital signals (RD) generated on a signal line 32 or 34. Receive-enable and transmit-enable signals are employed by the modems to initiate reception and transmission of signals, as is well known to those skilled in the art.

Briefly, the receive hardware and firmware in modem 10 will extract timing information from the analog signal received from modem 12. Modem 10 generates therefrom a receive-enable signal phase-locked to the transmit-enable signal at modem 12. However, this receive-enable signal of modem 10 is not phase-locked to the transmit-enable signal of modem 10. The transmit-enable signal of modem 10 is derived from an oscillator internal to modem 10 or from an external clock source. Modems 10 and 12 employ microprocessors to perform various receive-side and transmit-side procedures initiated by the receive-enable and transmit-enable signals, as will be explained in connection with FIG. 2.

Figure 2:
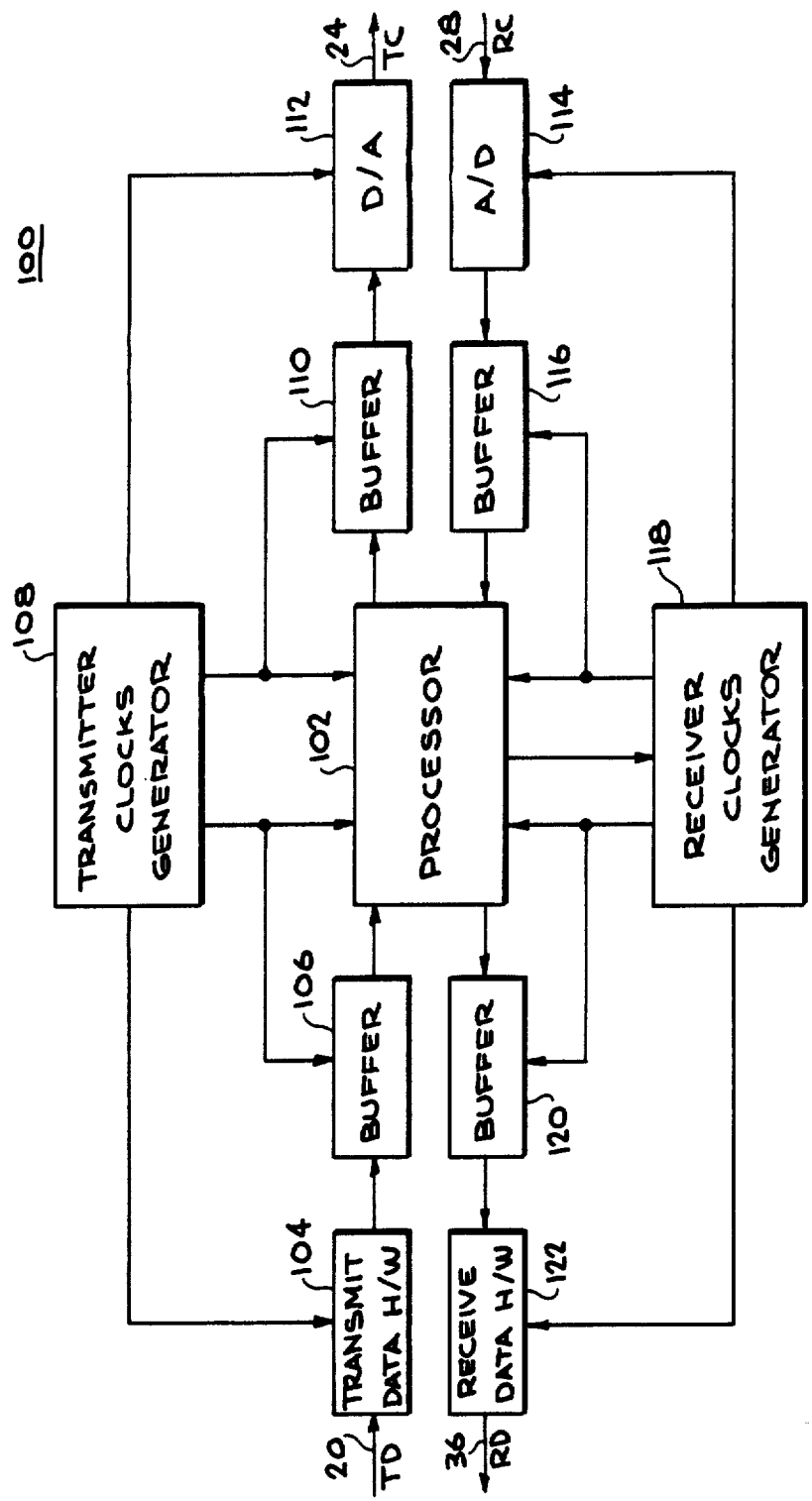
FIG. 2 is a block diagram of a modem employing a single processor of the present invention.

A block diagram of a modem 100 employing a single processor 102 is shown in FIG. 2. Various signal lines are shown connecting the elements of modem 100. Control signals generated by the elements shown in FIG. 2, especially the processor 102, are conducted along lines not shown in FIG. 2. Such control signals are well known to those skilled in the art. Also not shown in FIG. 2 is a memory used to store programs and data employed by the single processor 102 of the present invention. Such memories are also well known in the art.

A transmit data portion 104 of modem 100 formats the TD data signals received on line 20 and sends the formatted data to a buffer 106 synchronously at a rate Tx1. The clock signal Tx1 is generated by a transmitter clock generator portion 108. The processor of 102 will read the information in buffer 106 asynchronously. execute the transmitter-side procedures (stored in the memory referred to in the preceding paragraph) and send $N_T$ digitized samples of the analog signals (TD) to a buffer 110. Data is read from buffer 110 synchronously at a rate $N_T$ times Tx1, converted to an analog signal (TC) and generated on the signal line 24 by a digital-to-analog (D/A) portion 112.

An analog-to-digital (A/D) portion 114 converts the analog signals RC received on line 28 into digital values which are stored in a buffer 116 synchronously at a rate of $N_R$ times Rx1. The clock signal Rx1 is generated by a receiver clock generator 118 and $N_R$ is the number of digital values stored in buffer 116. The processor 102 reads values from buffer 116 asynchronously, executes the receiver-side procedures (stored in the memory referred to earlier) and sends the resulting data to a buffer 120. Data is read from buffer 120 synchronously at a rate of Rx1, formatted and transmitted as RD signals on line 32 by a receive data portion 122.

A routine in the receiver-side procedures will cause processor 102 to send a control signal to the receiver clocks generator 118 to phase-lock the receiver-enable signal with the transmit-enable signal of the other modem in the connection.

The size of buffer 106 and buffer 120 will be one word. This follows from the fact that the receiver-side procedure will run once every period of the Rx1 clock and the transmittal-side procedure will run once every period of the Tx1 clock.

The instant invention is a method for responding to the receive-enable and transmit-enable signals which allows for buffer 110 and buffer 116 to be very small while still causing no data loss due to overflow or underflow.

Figure 3A:
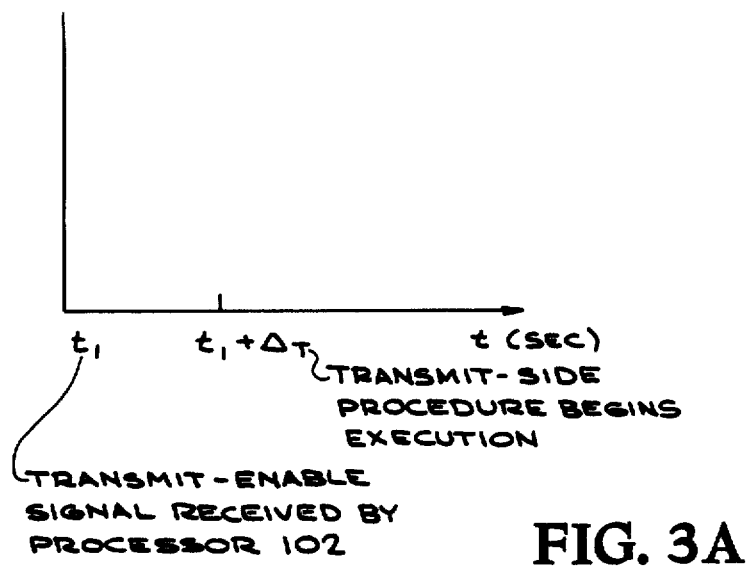
FIG. 3A and FIG. 3B are timing diagrams of the transmit- and receive-side, respectively, of a modem employing a single processor of the present invention.
Figure 3B:
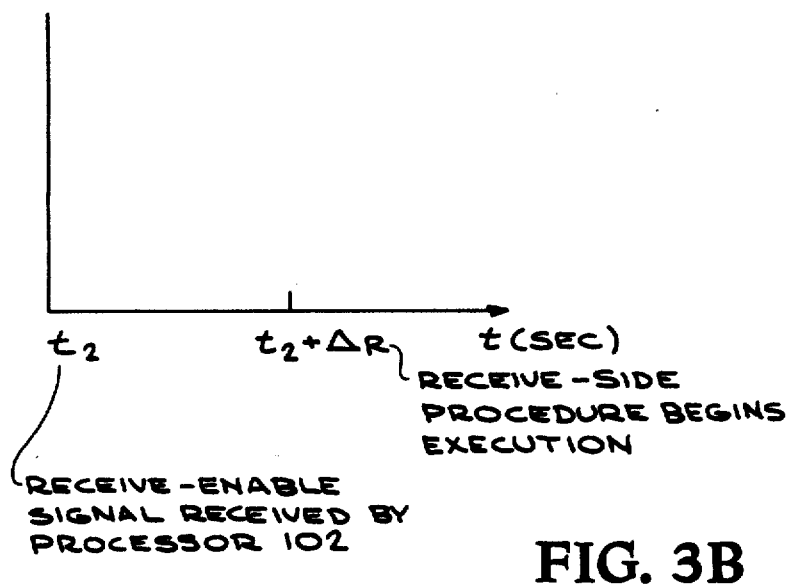

With reference to the timing diagrams of FIGS. 3A and 3B, if it were possible to always execute the transmitter-side procedures at the same time with respect to reception of the transmit-enable signal, the delay shown in FIG. 3A as $\Delta T$ is a constant, the size of buffer 110 would be $N_T$ which is a minimum. Similarly if it were possible to always execute the receiver-side procedures at the same time with respect to the receive-enable signal, the delay shown in FIG. 3B as $\Delta R$ is a constant, the size of buffer 116 would be $N_R$ which is minimum. However, due to the constraint of having only one processor 102 it is necessary to vary the values of $\Delta_T$ and $\Delta_R$.

In FIG. 3, $t_1$ indicates transmit-enable signal received by processor 102, $t_1 + \Delta_T$ indicates transmitter code begins execution; $t_2$ indicates receive-enable signal received by processor 102, and $t_2 + \Delta_R$ indicates when receiver code begins execution.

Defining:
$\Delta_T^{\wedge}$ = maximum value of $\Delta_T$ in sec.
$\Delta_T^{\vee}$ = minimum value of $\Delta_T$ in sec.
$\Delta_R^{\wedge}$ = maximum value of $\Delta_R$ in sec.
$\Delta_R^{\vee}$ = minimum value of $\Delta_R$ in sec.
$L_T$ = minimum size of buffer 110 required for no error
$L_R$ = minimum size of buffer 116 required for no error
then $L_T = N_T + N_T Tx1(\Delta_T^{\wedge} - \Delta_T^{\vee})$
and $L_R = N_R + N_R Rx1(\Delta_R^{\wedge} - \Delta_R^{\vee})$.

Figure 4:
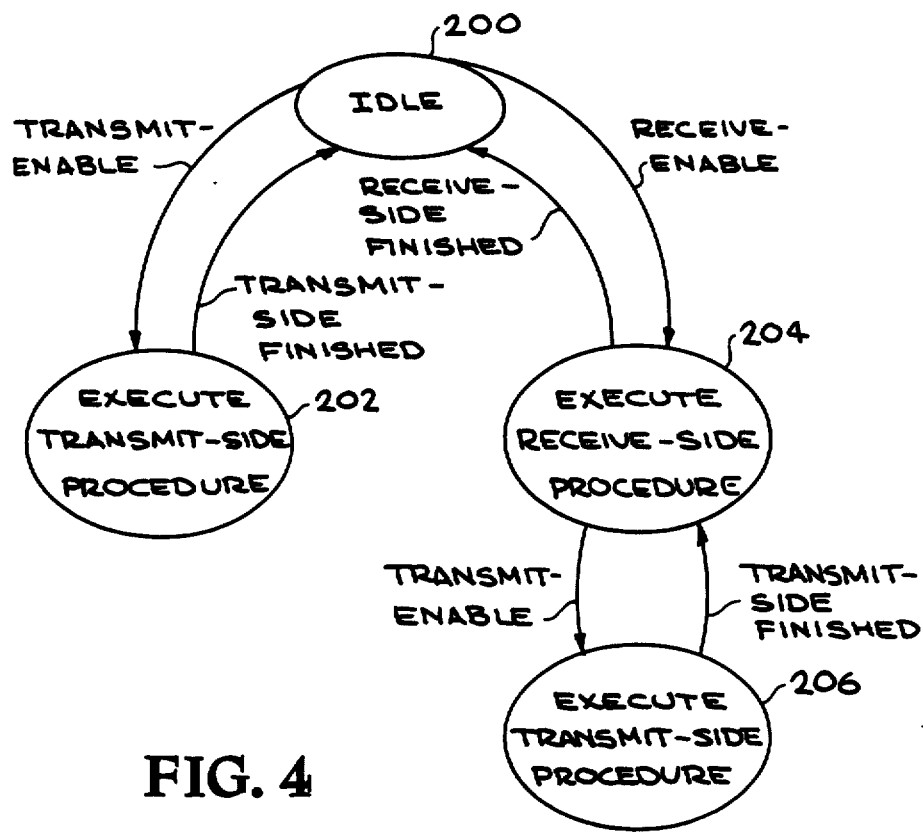
FIG. 4 is a state diagram illustrating the time-sharing procedure used by a modem employing a single processor of the instant invention.

Of course, the values of $\Delta_T^{\wedge}$, $\Delta_T^{\vee}$, $\Delta_R^{\wedge}$ and $\Delta_R^{\vee}$ are determined by the response times of the processor 102 and related circuitry, as well the timings specified in the following method which will be described in connection with the state diagram of FIG. 4: When the processor 102 receives the receive-enable signal and/or the transmit-enable signal:

(a) if processor 102 is idle when it receives the transmit-enable signal, then processor 102 executes transmitter-side procedure, shown in FIG. 4 as a transition from an idle state 200 to a run transmitter state 202;

(b) if processor 102 is idle when it receives the receive-enable signal, then processor 102 executes receiver-side procedure, transition from idle state 200 to a run receiver state 204;

(c) if processor 102 is executing a receiver-side procedure when it receives the transmit-enable signal, then:
  (i) processor 102 stops executing receiver-side procedure and processor 102 executes transmitter-side procedure until finished, transition from run receiver state 204 to a run transmitter state 206;
  (ii) processor 102 continues receiver-side procedure, transition from state 206 to state 204;

(d) if processor 102 is executing transmitter-side procedure when it receives the receive-enable signal then:
  (i) processor 102 finished transmitter-side procedure, remaining in state 202;
  (ii) processor 102 executes receiver-side procedure until finished, transition from state 202 to state 204.

The method described in the preceding paragraph favors execution of the transmitter-side procedure because it typically executes faster than the receiver-side procedure. Of course, the "transmit-side" priority used by the method, could be changed to a "receive-side" priority. This and other modifications, are within the scope of the instant invention and, accordingly, the appended claims set forth the metes and bounds of the invention.

I claim:

1. A full-duplex modem receiving digital data (TD) signals to be transmitted as analog data signals (TC) and receiving analog data signals (RC) to be converted to received digital data signals (RD), said modem receiving a transmit-enable signal and a receive-enable signal, said modem comprising:

means for generating a plurality of transmitter clock signals;

means for generating a plurality of receiver clock signals;

means responsive to one of said transmitter clock signals, for receiving said TD signals and synchronously generating therefrom signals at a predetermined rate Tx1;

first means for temporarily storing a predetermined number ($N_T$) of said synchronous signals generated from said TD signals;

means responsive to one of said receiver clock signals, for receiving said RC signals and synchronously generating therefrom digital signals at a predetermined multiple ($N_R$) of a predetermined rate Rx1;

second means for temporarily storing said predetermined multiple $N_R$ of said synchronous signals generated from said RC signals;

memory means for storing programs and data;

programmable digital processor means, operably connected to said memory means, responsive to said transmit- and receive-enable signals and responsive to at least one of said transmitter clock signals, and to at least one of said receiver clock signals, for sampling said temporarily-stored signals generated from said TD signals, for executing a transmit-side signal processing procedure thereon and for generating therefrom digitized transmit signals, for sampling said temporarily-stored signals generated from said RC signals, for executing a receive-side signal processing procedure thereon and for generating therefrom digitized receive signals;

third means reponsive to one of said transmitter clock signals for temporarily storing said digitized transmit signals;

means responsive to one of said transmitter clock signals for converting said temporarily-stored digitized transmit signals to said analog data signals (TC);

fourth means responsive to one of said receiver clock signals for temporarily storing said digitized receive signals; and means responsive to one of said receiver clock signals for receiving said temporarily-stored digitized receive signals and synchronously generating therefrom said received digital data signals (RD) at said predetermined rate Rx1;

wherein said processor means have a maximum, minimum, respectively, delay between reception of said transmit-enable signal and beginning execution of said transmit-side processing procedures of $\Delta'_T$, $\Delta''_T$, respectively, and has a maximum, minimum, respectively, delay between reception of said receive-enable signal and beginning execution of said receive-side processing procedures of $\Delta'_R$, $\Delta''_R$, respectively, wherein said third means temporarily stores $N_T + N_T \cdot (Tx1) \cdot (\Delta''_T - \Delta'_T)$ digitized transmit signals and wherein said second means temporarily stores $N_R + N_R \cdot (Rx1) \cdot (\Delta''_R - \Delta'_R)$ of said RC signals whereby said programmable digital processor means executes said transmit-side and said receive-side signal-processing procedures in time according to a predetermined schedule.

* * * * *